US011125653B2

(12) United States Patent
Cheng et al.

(10) Patent No.: US 11,125,653 B2
(45) Date of Patent: Sep. 21, 2021

(54) MOTION-INSENSITIVE FEATURES FOR CONDITION-BASED MAINTENANCE OF FACTORY ROBOTS

(71) Applicant: Palo Alto Research Center Incorporated, Palo Alto, CA (US)

(72) Inventors: Fangzhou Cheng, Mountain View, CA (US); Ajay Raghavan, Mountain View, CA (US); Deokwoo Jung, Mountain View, CA (US)

(73) Assignee: PALO ALTO RESEARCH CENTER INCORPORATED, Palo Alto, CA (US)

(*) Notice: Subject to any disclaimer, the term of this patent is extended or adjusted under 35 U.S.C. 154(b) by 428 days.

(21) Appl. No.: 16/158,175

(22) Filed: Oct. 11, 2018

(65) Prior Publication Data

US 2020/0116594 A1   Apr. 16, 2020

(51) Int. Cl.
*G01M 99/00* (2011.01)
*G05B 23/02* (2006.01)
*G06K 9/00* (2006.01)
*G06K 9/62* (2006.01)

(52) U.S. Cl.
CPC ....... *G01M 99/005* (2013.01); *G06K 9/00523* (2013.01); *G05B 23/0218* (2013.01); *G05B 23/0221* (2013.01); *G06K 9/6223* (2013.01)

(58) Field of Classification Search
None
See application file for complete search history.

(56) References Cited

U.S. PATENT DOCUMENTS

| 2013/0132000 A1* | 5/2013 | Tamaki | G06F 17/00 702/35 |
| 2013/0268241 A1* | 10/2013 | Das | G06F 11/00 702/185 |
| 2015/0260794 A1* | 9/2015 | Athikessavan | G01R 31/50 702/58 |
| 2018/0264613 A1 | 9/2018 | Tamai et al. | |
| 2018/0314914 A1* | 11/2018 | Kuriyama | G06K 9/6247 |

FOREIGN PATENT DOCUMENTS

| CN | 108195587 A * | 6/2018 | |
| EP | 2431137 A2 | 3/2012 | |
| WO | WO-2017221588 A1 * | 12/2017 | G01R 31/34 |
| WO | 2018176212 A1 | 10/2018 | |

* cited by examiner

*Primary Examiner* — John C Kuan
(74) *Attorney, Agent, or Firm* — Shun Yao; Park, Vaughan, Fleming & Dowler LLP

(57) ABSTRACT

One embodiment can provide a system for detecting faults in a machine. During operation, the system can obtain a dynamic signal associated with the machine, apply one or more signal-processing techniques to the dynamic signal to obtain frequency, amplitude, and/or time-frequency information associated with the dynamic signal, extract motion-insensitive features from the obtained frequency, amplitude, and/or time-frequency information associated with the dynamic signal, and determine whether a fault occurs in the machine based on the extracted features.

16 Claims, 20 Drawing Sheets
(13 of 20 Drawing Sheet(s) Filed in Color)

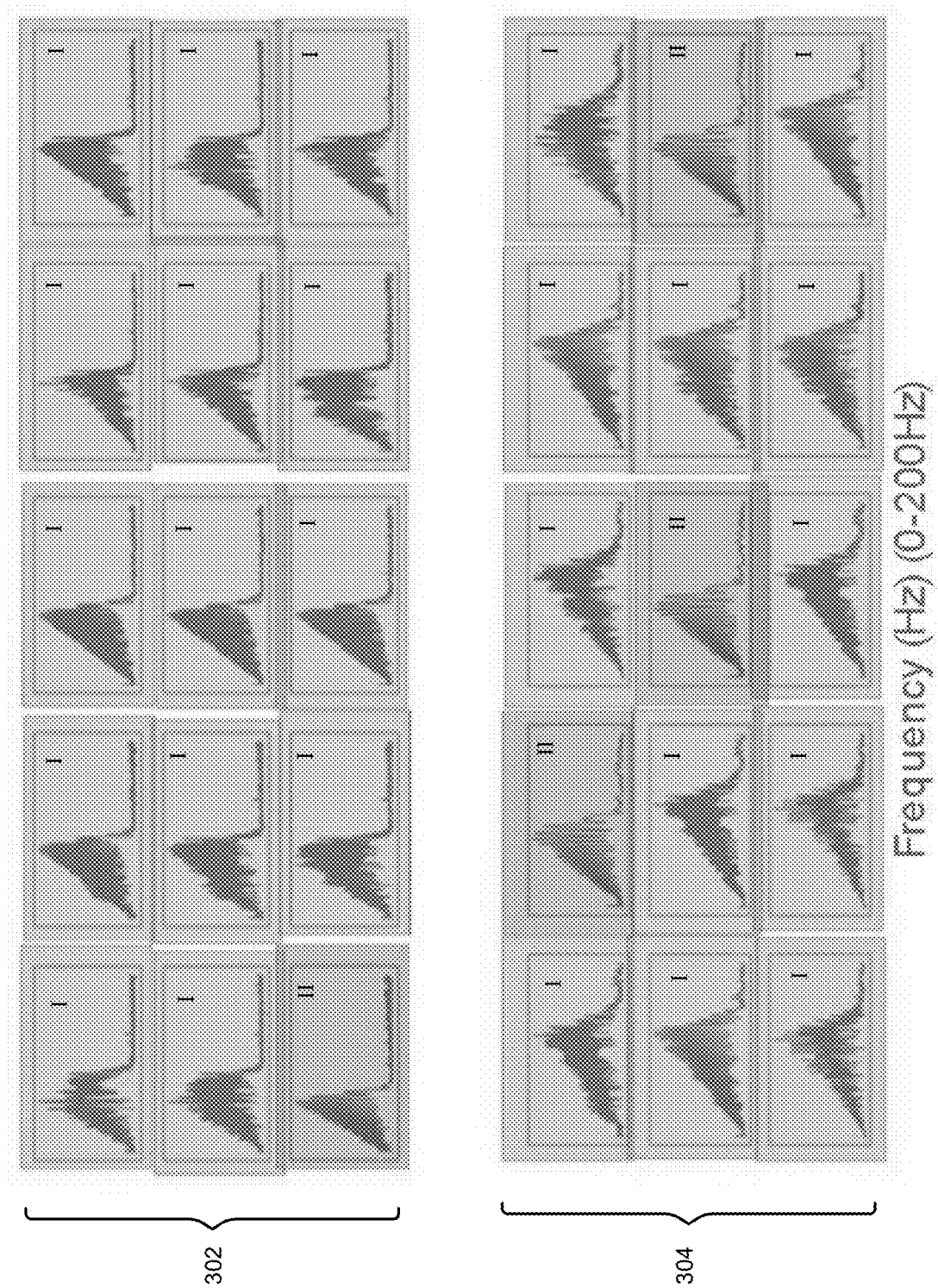

ature vector.
MOTION-INSENSITIVE FEATURES FOR CONDITION-BASED MAINTENANCE OF FACTORY ROBOTS

BACKGROUND

Field

This disclosure is generally related to a system and method for fault detection, diagnosis, and prognosis of robotic machines or systems. More specifically, this disclosure is related to fault detection based on motion-insensitive features extracted from current, acoustic, or vibration signals.

Related Art

Factory robots and other similar automation machines have been widely used in various industries (e.g., the automobile industry and consumer electronics industry) to improve productivity, quality, and safety in automated manufacturing processes. Many modern production lines may implement a large number of robots. An unforeseen failure in just one robot can have the potential to interrupt the operation of the entire production line, resulting in significant downtime, economic and production losses, and even worker injuries.

Maintenance of the factory robots can be essential in preventing robot failures. However, schedule-based maintenance (e.g., performing maintenance at predetermined time intervals) can be inefficient for large production lines, because unnecessary maintenance can lead to increased downtime. On the other hand, condition-based maintenance (CBM) (e.g., planning/performing maintenance based on the current and/or predicted future condition of the robots) can increase asset availability by reducing unnecessary maintenance and unplanned downtime. CBM requires detecting machine deterioration before failure occurs.

SUMMARY

One embodiment can provide a system for detecting faults in a machine. During operation, the system can obtain a dynamic signal associated with the machine, apply one or more signal-processing techniques to the dynamic signal to obtain frequency, amplitude, and/or time-frequency information associated with the dynamic signal, extract motion-insensitive features from the obtained frequency, amplitude, and/or time-frequency information associated with the dynamic signal, and determine whether a fault occurs in the machine based on the extracted features.

In a variation on this embodiment, the dynamic signal can include one of: a current signal, a vibration signal, and an acoustic signal.

In a variation on this embodiment, the system further preprocesses the obtained dynamic signal to remove high-frequency noise.

In a variation on this embodiment, the signal-processing techniques can include one or more of: a time-domain analysis, a frequency-domain analysis technique, and a time-frequency-domain analysis technique.

In a further variation, the time-domain analysis technique can include Hilbert transform, the frequency-domain analysis technique can include Fourier transform, and the time-frequency-domain analysis technique can include: short-time Fourier transform, wavelet analysis, and matching pursuit.

In a variation on this embodiment, the system can further segment the dynamic signal into a number of motion states based on the obtained frequency and/or amplitude information associated with the dynamic signal.

In a further variation, the motion states can include one or more of: an idle state, a transient state, and a steady state.

In a further variation, extracting the motion-insensitive features can include one or more of: computing, during the steady state, a ratio between a power of the frequency component having a maximum power and a total power of other frequency components; computing, during the steady state, a magnitude fluctuation index; and computing, during the transient state, a magnitude fluctuation index based on a Hilbert transform of the dynamic signal.

In a further variation, segmenting the dynamic signal comprises computing a variance of a frequency component having a maximum power.

In a variation on this embodiment, determining whether the fault occurs can include constructing a feature vector based on the extracted features and applying an unsupervised machine-learning technique to classify the feature vector.

In a further variation, the unsupervised machine-learning technique comprises a k-means clustering technique or a Gaussian mixture models (GMM) clustering technique.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 3A shows exemplary frequency-domain robot current signals, according to one embodiment.

In the figures, like reference numerals refer to the same figure elements.

DETAILED DESCRIPTION

Figure 1:
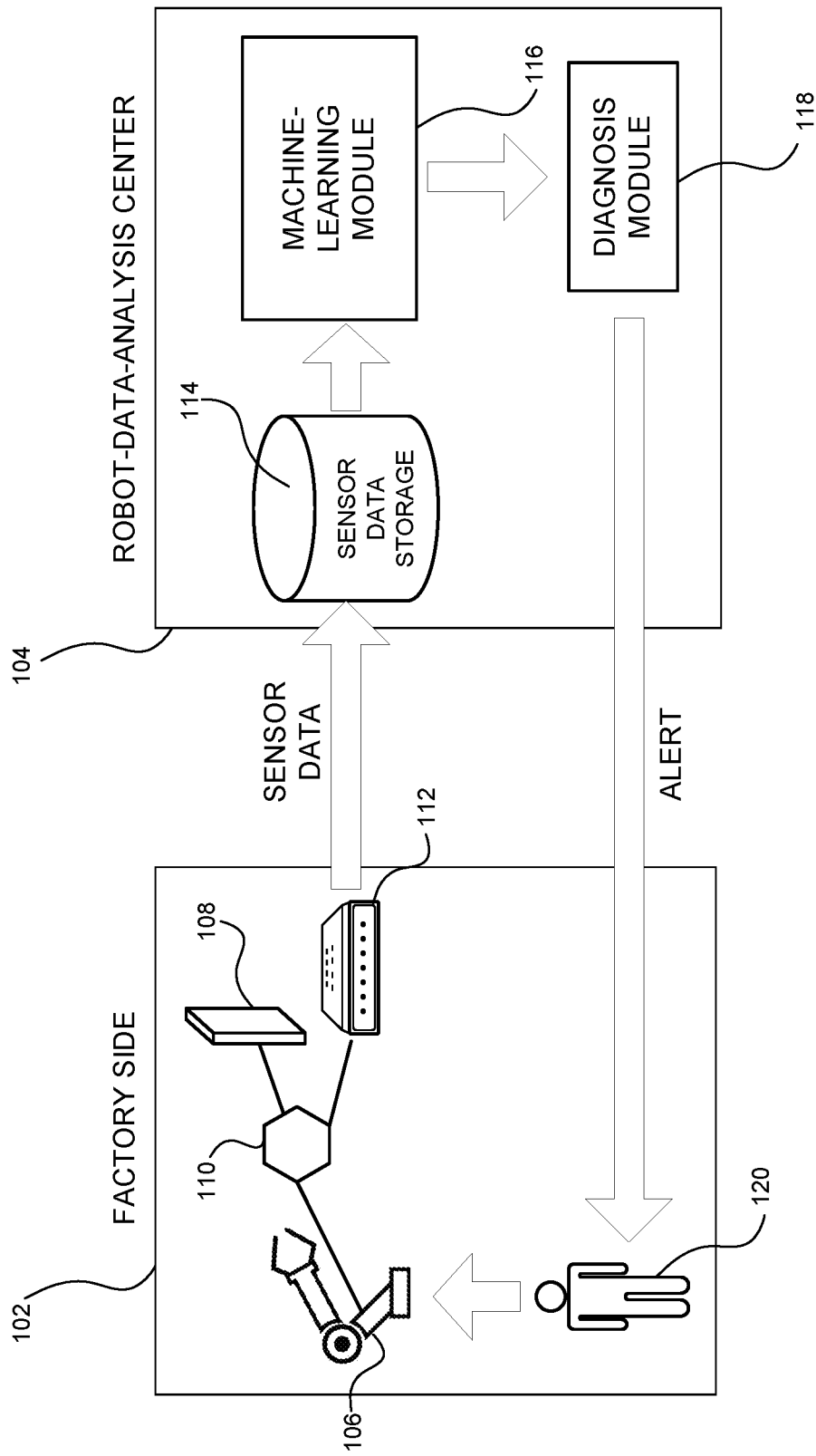
FIG. 1 illustrates an exemplary robot-monitoring and fault-detection system, according to one embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein solve the technical problem of detecting and predicting faults in factory robots. More specifically, a fault-monitoring-and-detection system can obtain sensor data from the robots, preprocess the sensor data to remove noise, and use various signal-processing techniques (e.g., Hilbert transform (HT) and short-time Fourier transform (STFT)) to obtain time-frequency amplitude information associated with the sensor data. More specifically, the sensor data can include current signals (e.g., the current signals between the servo motor and motor driver). The system can then extract motion-insensitive features from the processed signals. More specifically, the system can first identify different motion state periods from the sensor data and extract, from the steady/transient-state period, signal-to-noise ratios (SNRs) (obtained from the STFT of the signal) and a magnitude fluctuation index (MFI) (obtained from the Hilbert transform of the signal). By applying unsupervised machine-learning technique (e.g., k-means clustering), the system can automatically detect robot faults.

Current-Based Fault Monitoring and Detecting

There are many types of robot faults; some are minor and some are mission-critical. A common type of robot fault is mechanical fault (e.g., gear fault), which can sometimes be mission-critical. When such a fault occurs in a robot, the fault-induced vibration can impact the amplitude and frequency of the current signals between the servo motor and the motor driver. Hence, monitoring such current signals can provide health information for the robot. However, extracting robot health information from the current signals can be challenging, because the factory robot typically experiences different motions during its normal operation, and those motions can also affect the amplitude and frequency of the current signals. The fault-monitoring-and-detecting system needs to separate current signals due to robot abnormality from current signals due to normal motions. In some embodiments, the fault-monitoring-and-detecting system can monitor the current signals and extract, from the current signals, motion-insensitive features. Such motion-insensitive features can then be analyzed to provide information regarding the health of the robot. Analyzing such features often involves various signal-processing as well as machine-learning techniques. More specifically, unsupervised-learning techniques can be used due to the lack of labeled data.

FIG. 1 illustrates an exemplary robot-monitoring and fault-detection system, according to one embodiment. In some embodiments, robot fault-monitoring-and-detecting system 100 can include a factory side 102 and a robot-data-analysis center 104. Robot-data-analysis center 104 can be located near or within factory side 102, or located remotely. At factory side 102, a robot 106 is coupled to a motor driver 108, which provides current to a motor of robot 106. A current sensor 110 can measure the current between motor driver 108 and the motor. Various types of current sensor can be used. In some embodiments, a magneto-resistive sensor can be used to indirectly detect current signal in a non-intrusive manner by capturing magnetic field emitted from the current-carrying wire. Current sensor 110 can be coupled to an edge device 112, which transmits the current data to robot-data-analysis center 104. In some embodiments, current data can be sent to a data storage unit 114. Data storage unit 114 can store the current sensor data as well as previously received sensor data. The stored sensor data can be sent to a machine-learning module 116, which can cluster the sensor data using an unsupervised machine-learning technique (e.g., k-means clustering).

The output of machine-learning module 116 can be sent to a diagnosis module 118, which can determine whether the current signals indicate normal or abnormal operation of the robot. If abnormal operation is detected, diagnosis module 118 transmits an alert back to factory side 102. For example, the alert can be received by maintenance crew 120, who can then perform needed maintenance on robot 106 to prevent further deterioration of robot 106. In some embodiments, robot fault-monitoring-and-detecting system 100 can predict the robot degradation process, thus being capable of enabling condition-based maintenance of the factory robot.

Figure 2:
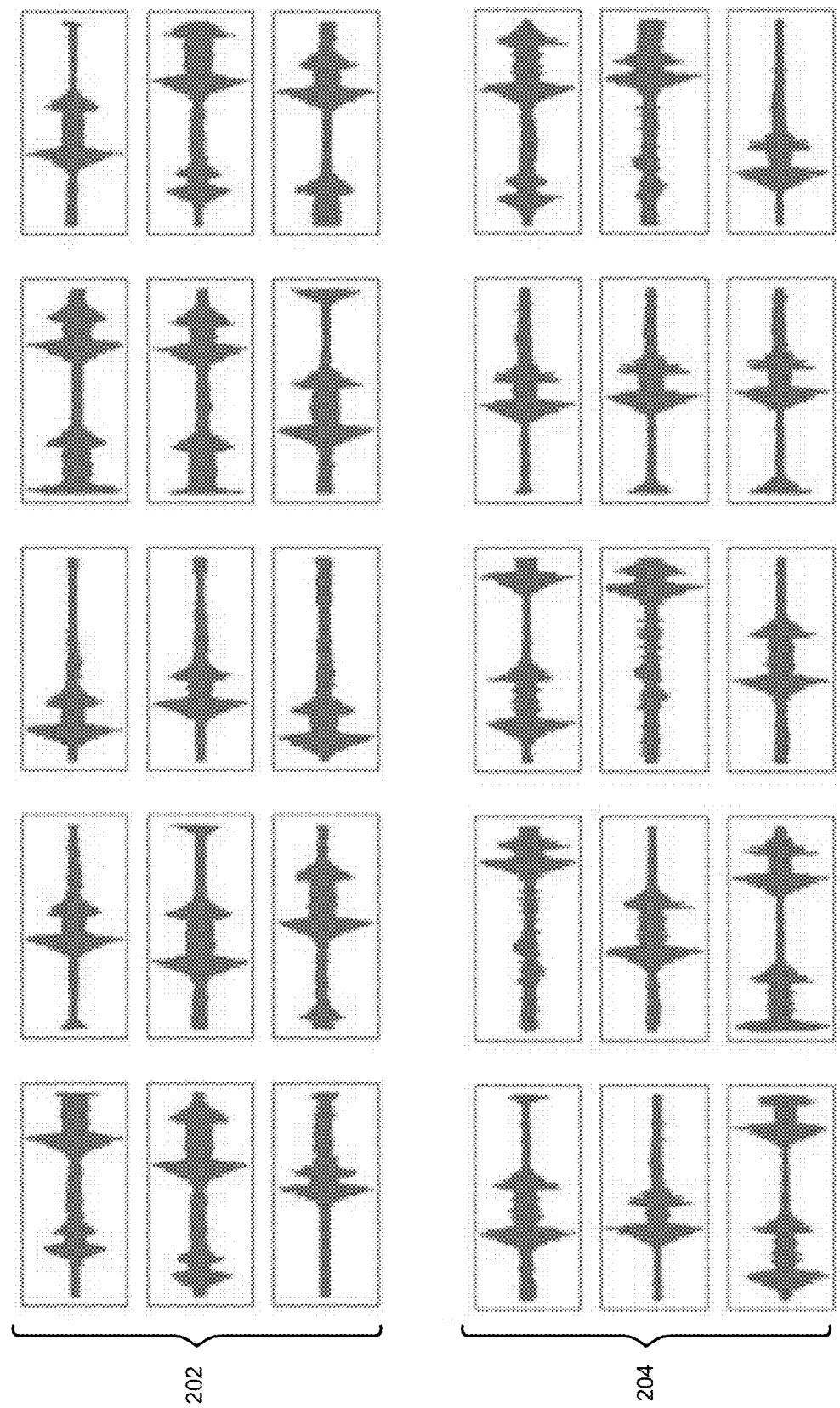
FIG. 2 shows exemplary time-domain robot current signals, according to one embodiment.

In some embodiments, extracting the motion-insensitive features from the current signals can involve extracting features from the time-domain signals, frequency-domain signals, or time-frequency domain signals. Certain signals (e.g., frequency-domain signals) can be motion-dependent. FIG. 2 shows exemplary time-domain robot current signals, according to one embodiment. For each signal, the horizontal axis corresponds to time, and the vertical axis corresponds to amplitude. In FIG. 2, the time-domain current signals are obtained for two robot-operation scenarios, one for normal operation and one for abnormal operation. More specifically, signals in signal set 202 are obtained under normal operation conditions, whereas signals in signal set 204 are obtained under abnormal operation conditions. The measurement time of the signals is about 2 seconds, and the sampling frequency can be 48 kHz. As one can see from FIG. 2, the time-domain signals under the normal and abnormal operation conditions can be very similar, hard to cluster. Attempting to cluster the time-domain current signals often results in the signals clustered based on the robot motions instead of the robot normality.

Figure 3B:
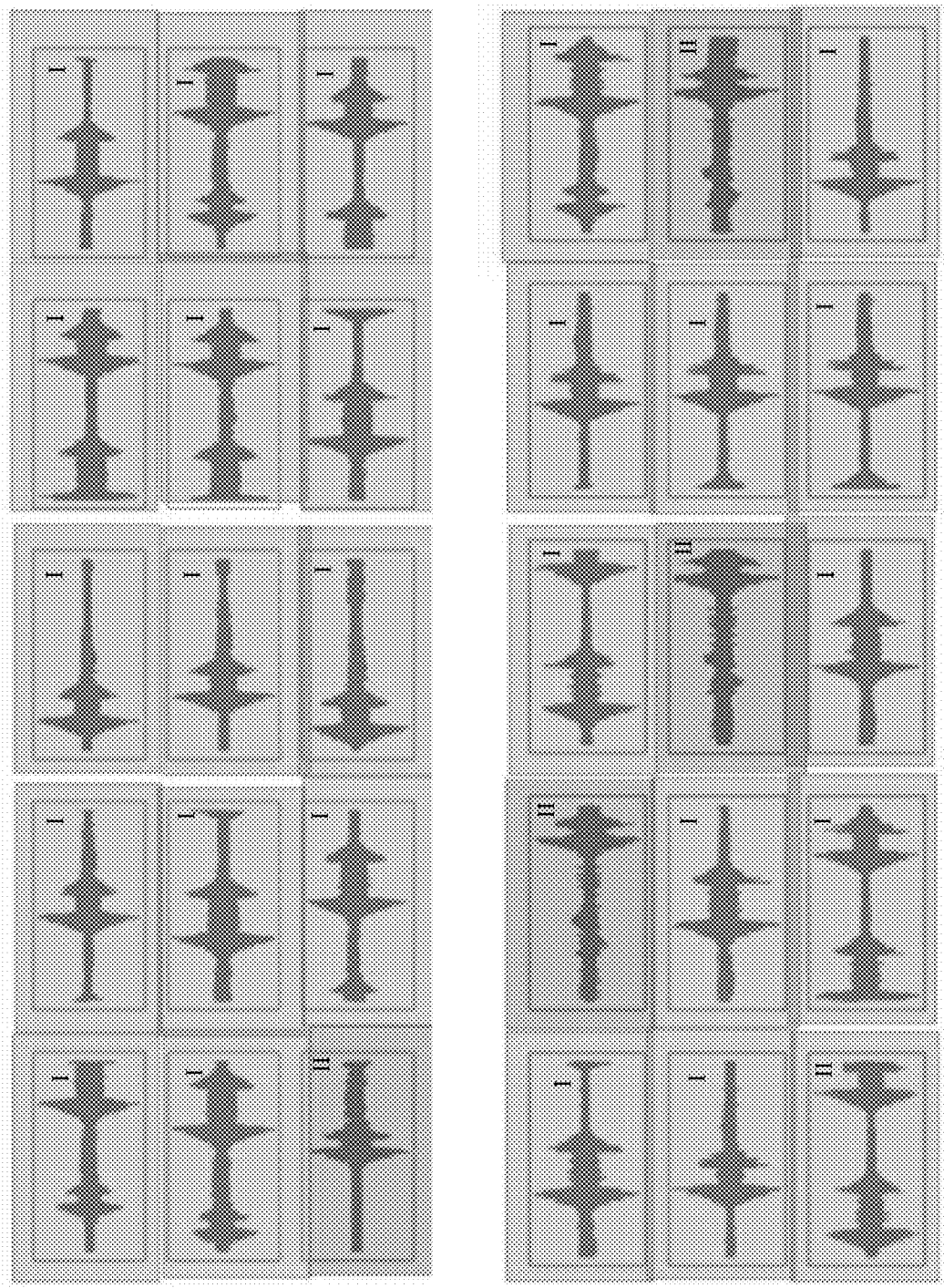
FIG. 3B shows the fast Fourier transform (FFT)-based clustering result reflected by the time-domain signals, according to one embodiment.

Another possible solution is to study the frequency-domain current signals. In some embodiments, to eliminate high-frequency noise (e.g., converter switching noise), the current signals can be preprocessed (e.g., applying a low-pass filter). FIG. 3A shows exemplary frequency-domain robot current signals, according to one embodiment. The frequency-domain current signals shown in FIG. 3A can be obtained by applying fast Fourier transform (FFT) on the time-domain signals shown in FIG. 2 and then applying a low-pass filter with a cut-off frequency of about 200 Hz. In FIG. 3A, the frequency-domain signals in signal sets 302 and 304 correspond to signal sets 202 and 204, respectively, shown in FIG. 2. Application of an unsupervised machine-learning technique (e.g., k-means clustering) on the frequency-domain current signals may result in the signals being clustered into motion-dependent clusters (clusters I and II). FIG. 3B shows the FFT-based clustering result reflected by the time-domain signals, according to one embodiment. Note that the time-domain signals shown in FIG. 3B are similar to the time-domain signals shown in FIG. 2, except that FIG. 3B shows the FFT-based clustering result. As shown in FIG. 3B, signals clustered into cluster I have similar motion patterns, and signals clustered into cluster II have similar motion patterns.

Figure 4:
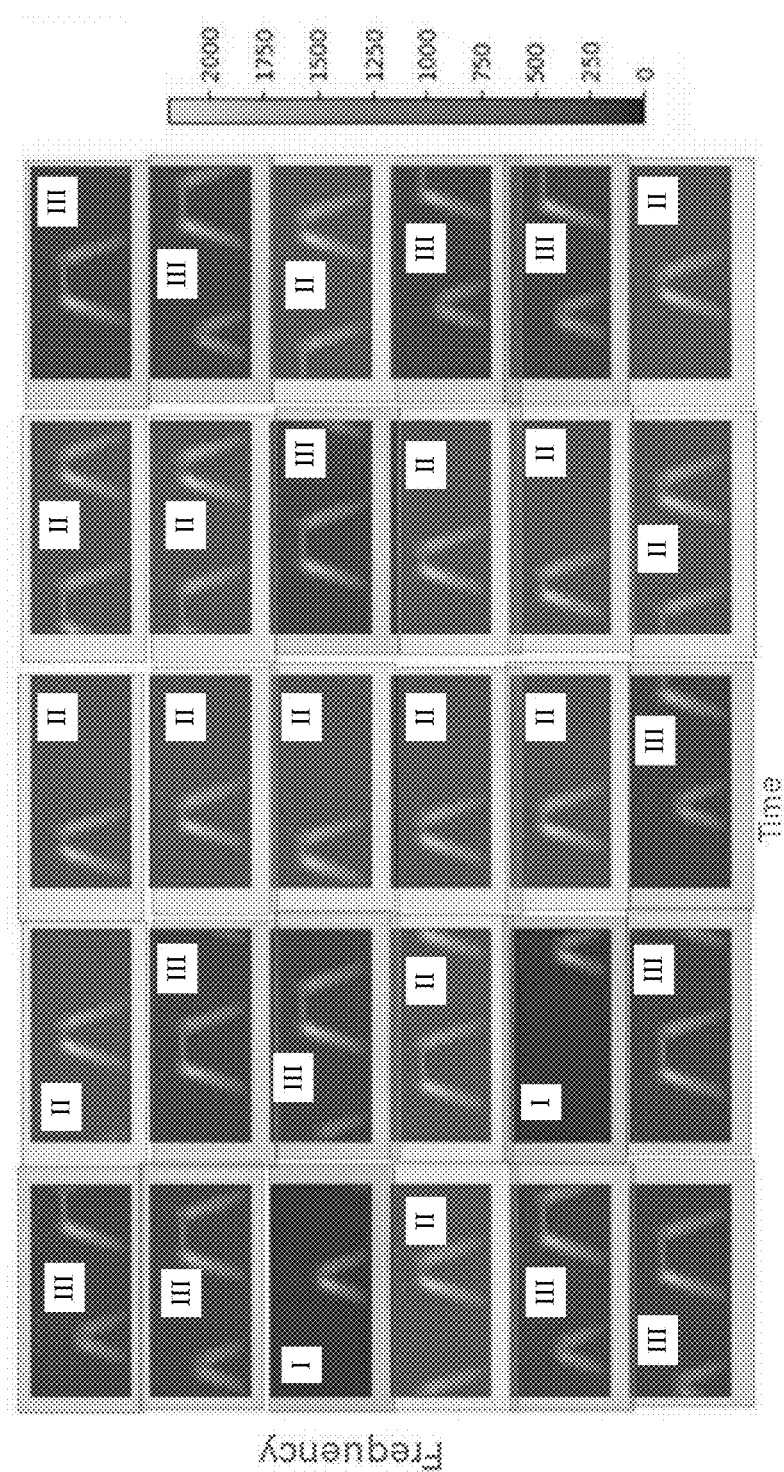
FIG. 4 shows an exemplary short-time Fourier transform (STFT)-based clustering result, according to one embodiment.

Short-time Fourier transform (STFT) can provide time-varying frequency information and can be obtained by computing the Fourier spectra using a sliding window:

$$STFT(t, f) = \int_{-\infty}^{+\infty} i_{ra}(\tau)h(\tau - t)e^{-j2\pi f\tau} d\tau, \quad (1)$$

where h(t) is a window function. FIG. 4 shows an exemplary STFT-based clustering result, according to one embodiment. Using a k-means clustering technique by setting k equal to 3, the various robot current signals have been clustered into three different clusters based on their STFT pattern. Again, the clustering operation results in motion-based clusters. Signals in the same cluster have similar motion patterns. However, a closer look at the STFT of the current signals can reveal certain features that may be related to robot fault.

Figure 5:
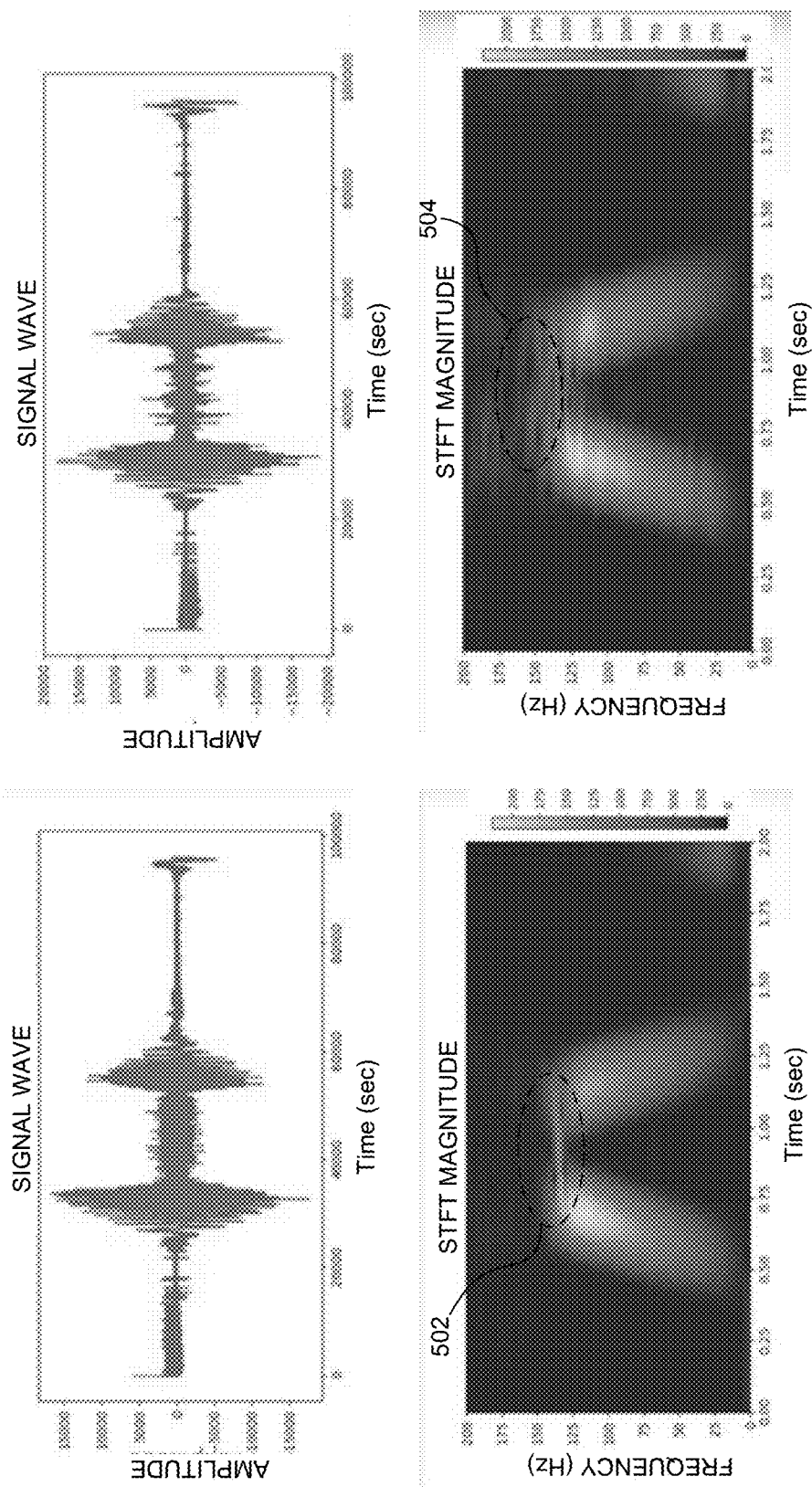
FIG. 5 shows an amplified view of the STFTs of robot current signals under normal and abnormal conditions, according to one embodiment.

FIG. 5 shows an amplified view of the STFTs of robot current signals under normal and abnormal conditions, according to one embodiment. The left-side drawings are for normal operation conditions and the right-side drawings are for abnormal operation conditions. Moreover, the top left and top right drawings show the time-domain current signals and the bottom left and bottom right drawing show the STFT of the corresponding time-domain signals. The bottom drawings show that, when the frequency increases with time, the robot motion is accelerating, and when the frequency decreases with time, the robot motion is decelerating. On the other hand, when the frequency remains roughly constant, the robot motion is roughly in the steady state (e.g., rotating at a constant frequency), as indicated by circles 502 and 504. Comparing the STFT signals under the steady state condition (as marked by circles 502 and 504), one can see that the frequency components for the different times remains more concentrated under normal operation (top drawings), whereas the frequency components for the abnormal operation become dispersed (bottom drawings). Such a feature may be used to distinguish between normal and abnormal robot operations.

In addition to STFT, Hilbert transform can be a good tool for understanding instantaneous amplitude and frequency of the robot current signals. The Hilbert transform of robot current signal $i_{sa}$(t) can be expressed as:

$$\hat{i}_{sa}(t) = H\{i_{sa}(t)\} = \frac{1}{\pi} \int_{-\infty}^{\infty} \frac{i_{sa}(\tau)}{t-\tau} d\tau. \quad (2)$$

Figure 6:
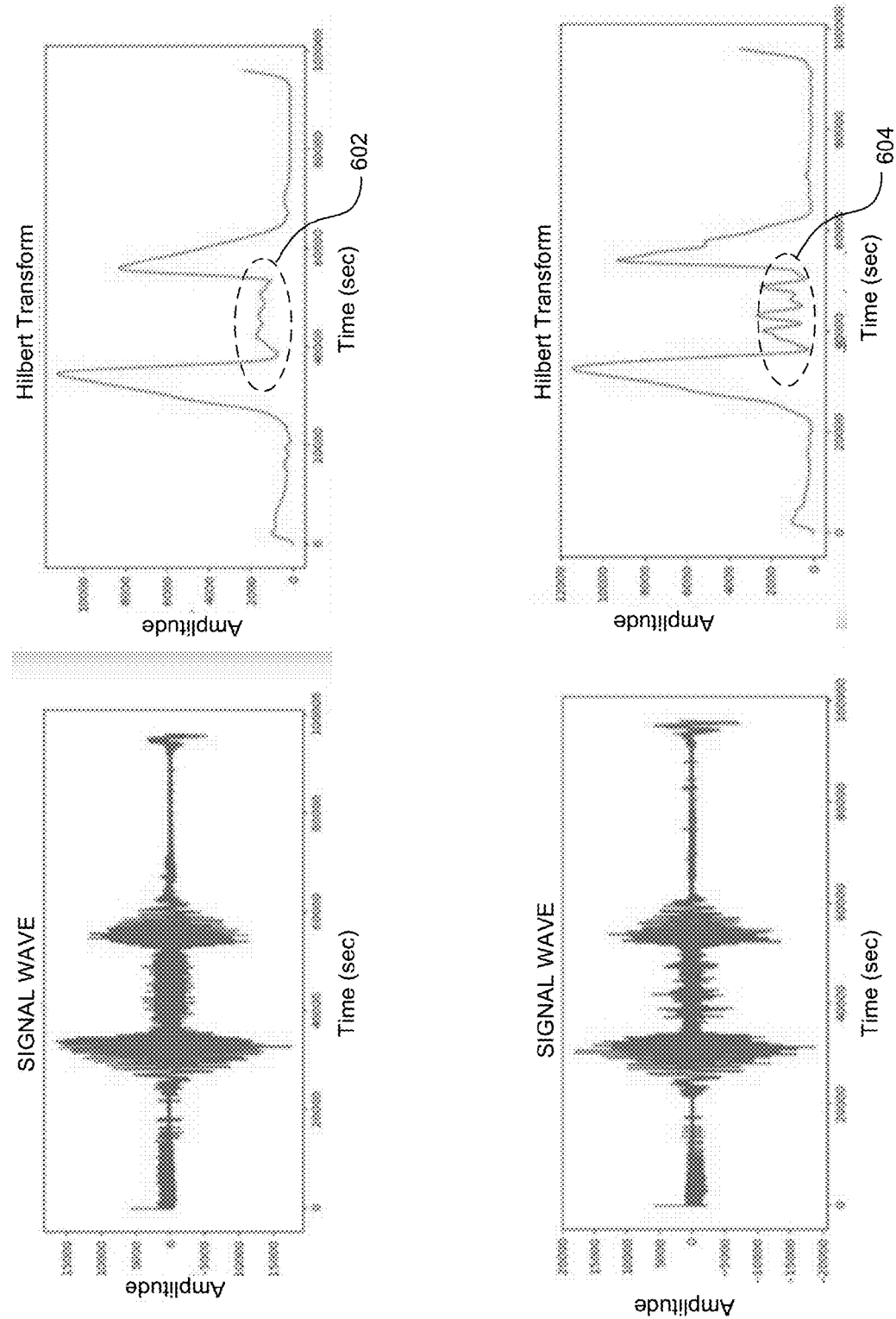
FIG. 6 shows the magnitudes of the Hilbert transforms of robot current signals under normal and abnormal conditions, according to one embodiment.

FIG. 6 shows the amplitudes of the Hilbert transforms of robot current signals under normal and abnormal conditions, according to one embodiment. The top two drawings are for normal operation conditions and the lower two drawings are for abnormal operation conditions. Moreover, the left-side drawings show the time-domain current signals and the right-side drawings show the Hilbert transform of the time-domain current signals. Similar to the situations shown in FIG. 5, in FIG. 6, when the robot motion is in the steady state (as indicated by circles 602 and 604), the amplitudes of the Hilbert transforms remain relatively flat for normal robot operation but vary significantly for abnormal robot operation. Similarly, this feature can also be useful in robot-fault detection.

Figure 7:
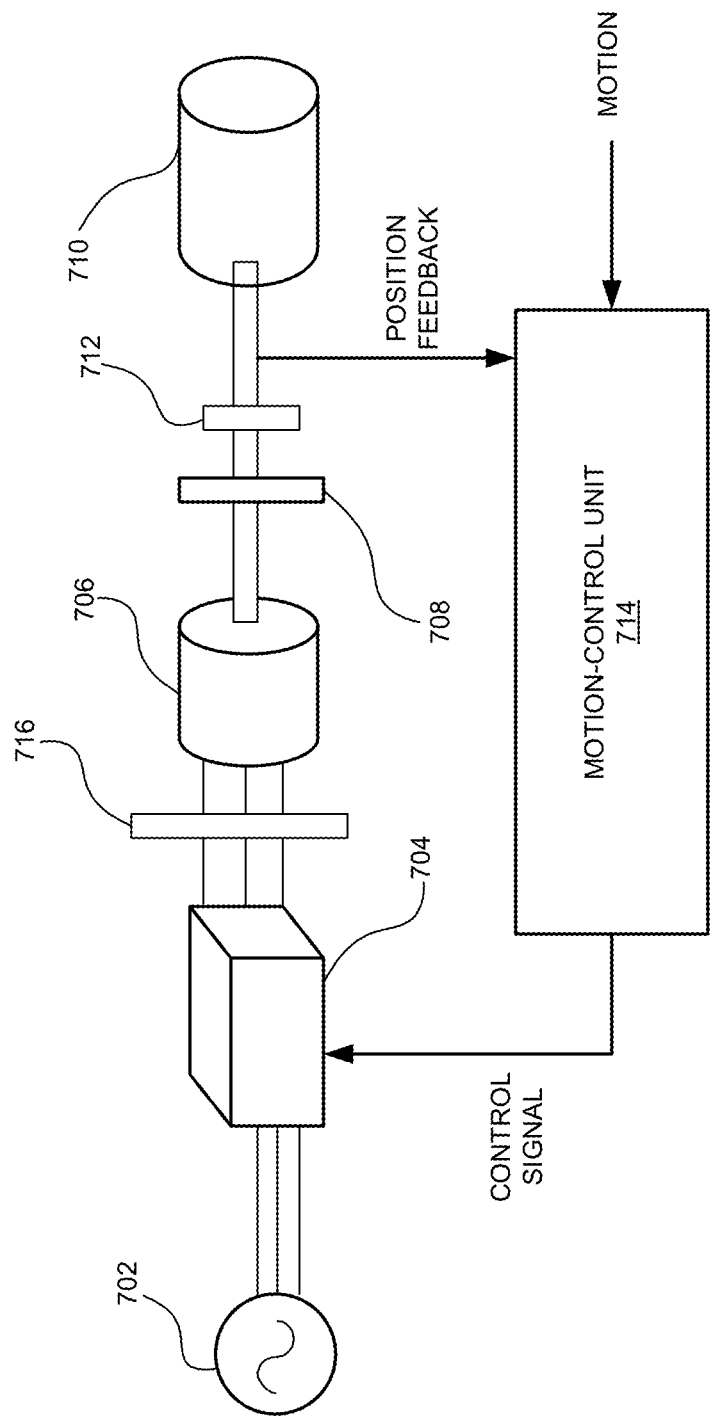
FIG. 7 shows a diagram illustrating impacts of gear faults on the robot current signals, according to one embodiment.

To determine which features are motion-insensitive and can be most useful in detecting robot fault, one needs to have a physical understanding of the robot fault. A typical robot fault can be caused by a gear fault. FIG. 7 shows a diagram illustrating impacts of gear faults on the robot current signals, according to one embodiment. In FIG. 7, a power source 702 provides power to motor driver 704, which drives motor 706. Motor 706 can cause rotations of gear 708, which in turn provides motions to robot 710. An encoder 712 can provide position control. A motion-control unit 714 receives position feedback and sends motion-control signals to motor driver 704, which adjusts its output current accordingly.

A fault in gear 708 can alternate the stiffness of the teeth and, in turn, lead to amplitude and frequency modulation in vibrations. The modulated vibration can cause ripples in motor torque and/or speed. The torque transmitted through the gear can be expressed as:

$$T(t) = T_0(t) + \sum_{n=1}^{N} T_n(t) \cdot \cos\left[\int 2\pi \cdot f_n(t) \cdot dt + \phi_n(t)\right], \quad (3)$$

and the frequency can also be modulated as:

$$f_{C1}(t) = f_s(t) + \sum_{n=1}^{N} A_n(t) \cdot \sin\left[\int 2\pi \cdot f_n(t) \cdot dt + \phi_n(t)\right], \quad (4)$$

where N is the number of fault frequency components induced by gear fault, $f_s$ the rotating frequency, $A_n$ and $T_n$ the oscillation amplitudes, and $\phi_n$ the oscillation phase.

The modulated current signal can be expressed as:

$$C(t) = I_{C1}(t) \cdot \sin\left[\int 2\pi \cdot f_{C1}(t) \cdot dt\right]. \quad (5)$$

Because the current is proportional to power, which equals the product of speed and torque, the amplitude of current $I_{C1}$(t) can be expressed as:

$$I_{C1}(t) \propto T(t) \times f_{C1}(t). \quad (6)$$

Substituting equations (3), (4) and (5) into relationship (6), one can obtain:

$$C(t) \propto T_0(t) \cdot f_s(t) \sin\left(\int 2\pi f_s(t) dt\right). \quad (7)$$

Relationship (7) describes the situation where there is no fault in the gear. From (7), one can see that the gear rotating frequency $f_s$ can affect both amplitude and frequency of the current signal.

The speed and/or torque ripples of gear 708 can result in ripples in position that feed back to motion control unit 714, which then generates and sends control signals that are affected by those ripples to motor driver 704. Consequently, the output power of motor driver 704 can include fault features due to the frequency and amplitude demodulation of the motion. A current sensor 716 positioned between motor driver 704 and motor 706 can provide current measurement results.

By monitoring the current signal, one can detect motor faults. In some embodiments, two approaches have been used to identify faults. The first is to determine the signal-to-noise ratio (SNR) of the frequency components of the current signal related to fault. More specifically, the frequency components related to fault f(t) in the current signal can be expressed as:

$$f \mid f(t) = f_s(t) \pm \sum_{n=1}^{N} k_n \times f_n(t). \qquad (8)$$

The second approach is to determine the oscillation terms in the current amplitude, referred to as the magnitude fluctuation index (MFI). If the second-order terms are neglected, the amplitude of the current signal can be expressed as:

$$T_0(t) \cdot f_s(t) + \Sigma_{n=1}^N \sqrt{T_0(t)^2 A_n(t)^2 + f_s(t)^2 T_n(t)^2} \sin(\int 2\pi f_n(t) dt + \theta_n(t)). \qquad (9)$$

Figure 8:
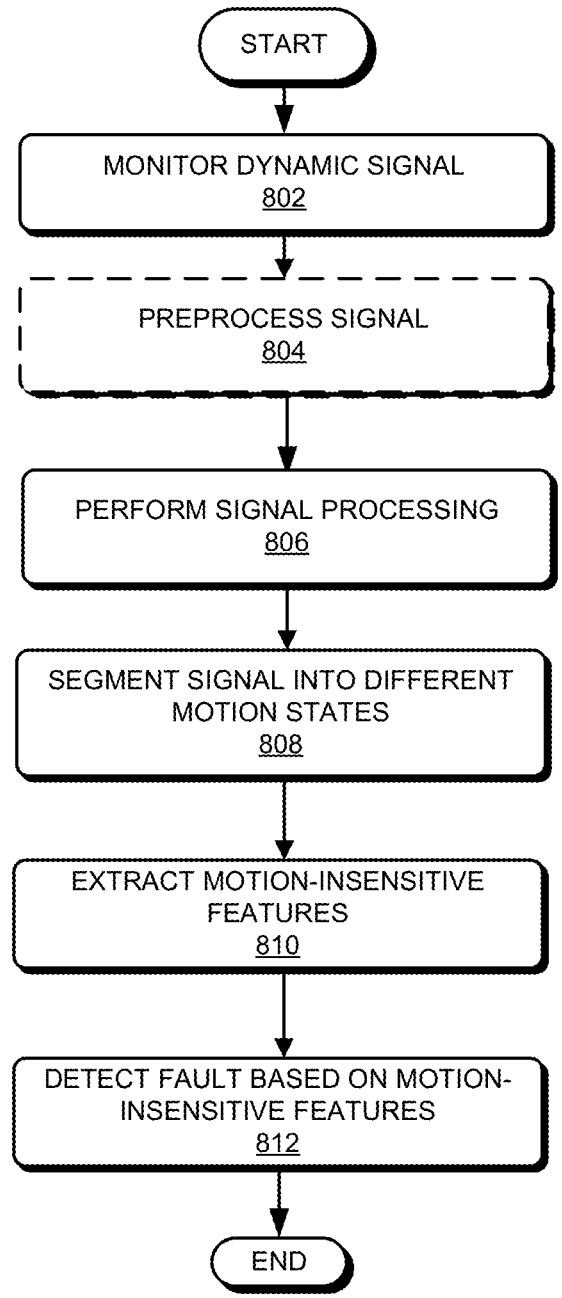
FIG. 8 presents a flowchart illustrating an exemplary process for detecting robot fault, according to one embodiment.

In some embodiments, motor-fault analysis is performed using current signals obtained when the motor motion is in the steady state. More specifically, the system can extract certain features from the steady-state current signal in order to detect fault. As discussed previously, this approach can reduce the impact of the motion in the fault analysis. FIG. 8 presents a flowchart illustrating an exemplary process for detecting robot fault, according to one embodiment.

During operation, the system monitors a dynamic signal associated with the robot (operation 802). Various types of dynamic signal can be useful in robot-fault detection, including but not limited to: current sent from a motor driver to a motor, vibration, and acoustic signals (e.g., motor noise). In some embodiments, the system monitors, using a current sensor, the current signal between a motor driver and a motor using a current sensor positioned between the motor driver and the motor. Moreover, the system can use motion sensors to monitor vibration and sound sensors to monitor sound. In some embodiments, the system continuously monitors the current signal and generates a plurality of data files. Each data file contains current signals within a short period (e.g., a few seconds). In alternative embodiments, the system may sample, at predetermined time intervals, the current signal. Each sampling period can be about a few seconds. The system can optionally preprocess the monitored signal (operation 804). In some embodiments, one or more low-pass filters can be applied to remove high-frequency noise.

Subsequently, the system can perform one or more signal-processing operations on the preprocessed dynamic signal (operation 806). In some embodiments, the system can obtain various transformations of the dynamic signal, such as STFT and Hilbert transformation (HT). In addition to STFT and HT, other time-frequency analysis techniques, including but not limited to: wavelet transform and matching pursuit (MP), can also be used to obtain frequency and/or amplitude information associated with the dynamic signal. Based on the signal-processing result, the system can segment the signal into different motion states (operation 808). In some embodiments, the signal can be segmented into three different motions states, the idle state, the transient state, and the steady state. The idle state refers to a situation where there is no motion and the frequency of the instant signal is zero. The transient state refers to a situation where both the amplitude and frequency of the instant signal vary. The steady state refers to a situation where both the amplitude and frequency of the instant signal remain constant. In some embodiments, segmentation of the signal can be performed based on the variance of frequency. More specifically, the system can estimate the motion state of the signal at a particular time instant.

Figure 9:
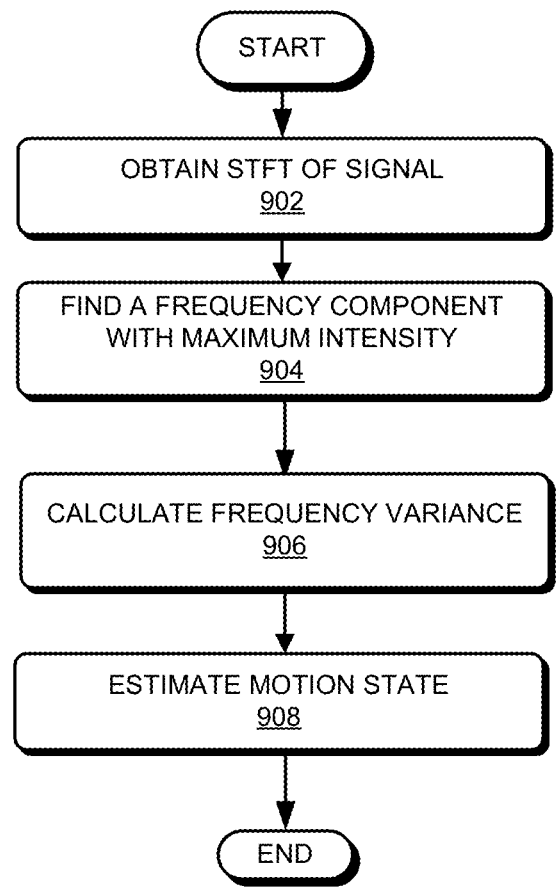
FIG. 9 presents a flowchart illustrating an exemplary process for estimating the motion state, according to one embodiment.

FIG. 9 presents a flowchart illustrating an exemplary process for estimating the motion state, according to one embodiment. During operation, the system can obtain the STFT of the dynamic signal (e.g., the motor current signal) (operation 902). For each time instant, the system can find a frequency component with maximum intensity, referred to as f_largest (operation 904). The system can then calculate the variance of the frequency component with maximum intensity (i.e., f_largest) (operation 906) and estimate the motion state of each time instant based on the calculated frequency variance (operation 908). More specifically, the system can determine that the motion state is either in idle or steady state when the frequency variance is below a predetermined threshold. In such a situation, if the signal frequency is zero, the motion state is idle, whereas if the signal frequency is non-zero, the motions state is steady state.

Figure 10:
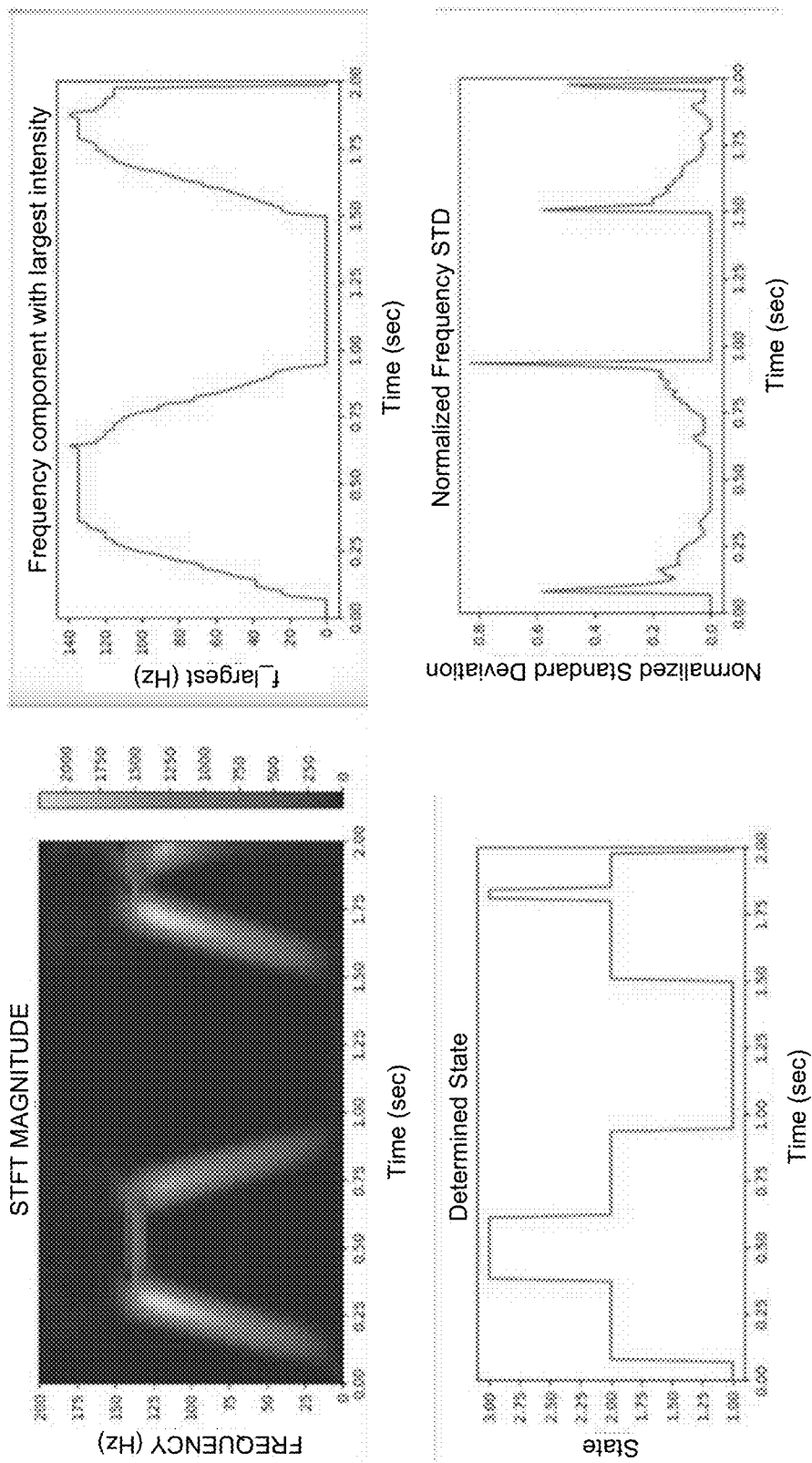
FIG. 10 shows a motion-state estimation example, according to one embodiment.

FIG. 10 shows a motion-state estimation example, according to one embodiment. The upper left drawing of FIG. 10 shows the STFT of a motor current signal, and the upper right drawing shows the frequency component with maximum intensity at each time instant. The lower right drawing shows the frequency variance, and the lower left drawing shows the estimated states, where state=1 indicates the idle state, state=2 indicates the transient state, and state=3 indicates the steady state.

Returning to FIG. 8, subsequent to segmenting the dynamic signal, the system can extract, from the steady state segment, motion-insensitive features (operation 810). Various types of signal feature can facilitate fault detection. In some embodiments, the system may extract SNR information from the STFT of the dynamic signal (e.g., motor current signal). For example, the system can find, at each time instant, a frequency component with maximum intensity. As discussed before, the STFT of the signal is $$STFT(t, f) = \int_{-\infty}^{+\infty} i_{ra}(\tau) h(\tau - t) e^{-j2\pi f \tau} d\tau,$$

and the frequency component with the maximum intensity can be defined as:

$$f\_{largest}(t) = \arg\max\{|STFT(t,f)|\}. \qquad (10)$$

For each time instant within the steady state, the system can calculate the ratio between the signal power intensity (i.e., the power of the frequency component with maximum intensity) and the noise power intensity (i.e., the power of all other frequency components). In other words, the frequency component with the strongest intensity is considered signal, whereas all other frequency components are considered noise, and P_noise=P_total−P_signal. The SNR can be calculated as:

$$SNR = \frac{P\_signal}{P\_noise}.$$

In some embodiments, the signal and noise power can be the average signal and noise power, respectively, over the steady state time period. A lower SNR may indicate fault.

Figure 11:
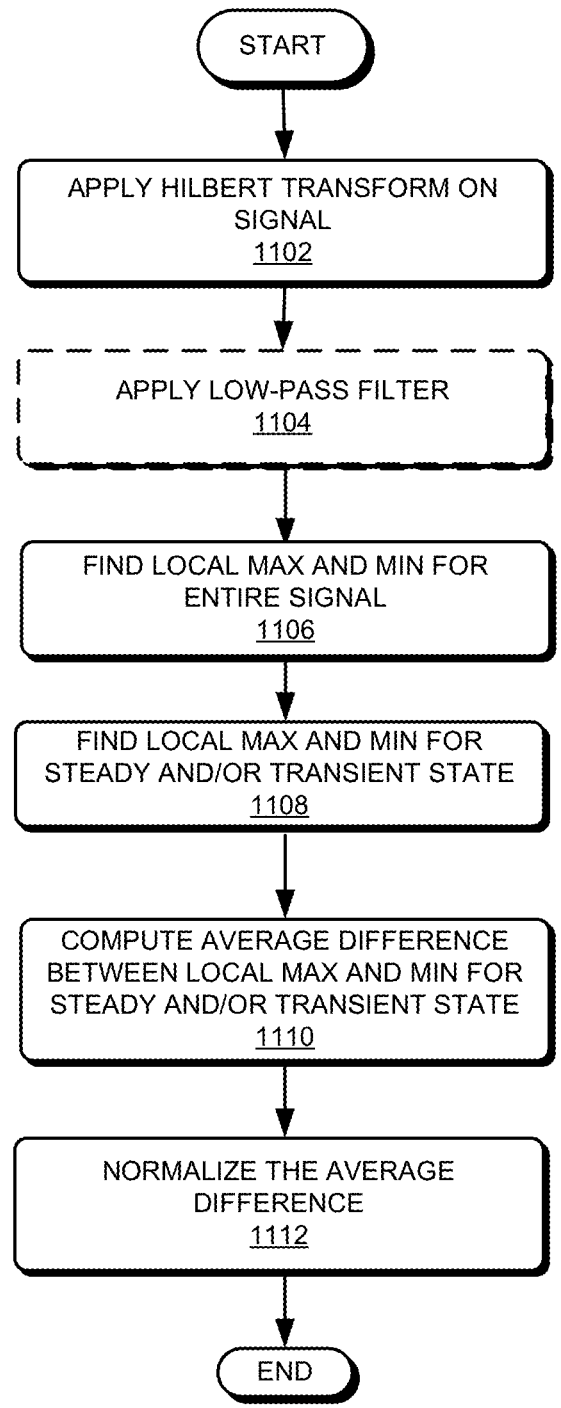
FIG. 11 presents a flowchart illustrating an exemplary process for determining MFI, according to one embodiment.

In addition to the signal SNR, other features can also be fault-sensitive. In some embodiments, the system can extract the magnitude fluctuation index (MFI) from the steady state segment of the dynamic signal. As discussed previously, the MFI reflects the amount of oscillation in the amplitude of the dynamic signal. FIG. 11 presents a flowchart illustrating an exemplary process for determining MFI, according to one embodiment. During operation, the system applies the Hilbert transform on the time-domain dynamic signal (operation 1102) and optionally uses a low-pass filter to smooth the waveform (operation 1104). The system can then find the local maxima and minima for the entire signal (operation 1106) and the local maxima and minima for the steady state segment and/or the transient state segment (operation 1108). The system can then compute the average difference between local maxima and minima in the steady and/or transient state (operation 1110) and normalize the result over the average of the local maxima and minima (operation 1112). The normalized result is the MFI, expressed as:

$$MFI = \frac{\sum_{i=1}^{N} sum(\max(i) - \min(i))}{\sum_{i=1}^{N} sum(\max(i) + \min(i))/2}, \quad (11)$$

where N is the number of local maxima points in the steady state. A relatively larger (e.g., larger than a predetermined threshold) MFI often indicates fault.

Returning to FIG. 8, subsequent to extracting the motion-insensitive features, the system can detect motor fault based on the extracted features (operation 812). In some embodiments, detecting motor faults can involve determining whether the signal SNR at the steady state is below a predetermined threshold. If so, a fault is detected. In some embodiments, detecting motor faults can involve determining whether the MFI is above a predetermined threshold. If so, a fault is detected. Subsequent to detecting a fault, the system may send an alert to notify the maintenance crew. In some embodiments, the system may send an alert to the control unit of the robot. Depending on the type of fault, the control unit may halt the operation of the robot to prevent further damage to the robot or possible worker injuries.

Figure 12:
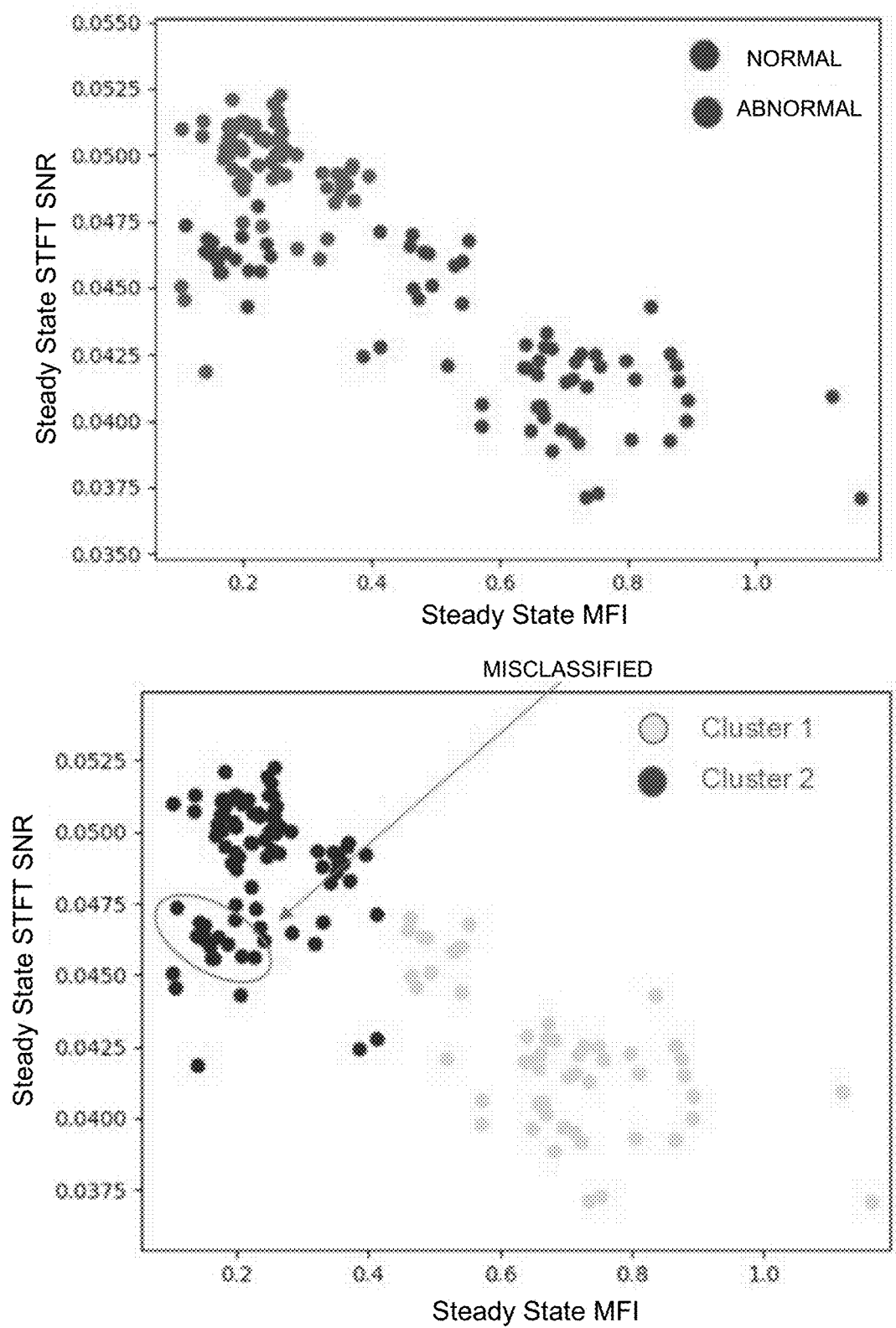
FIG. 12 shows an exemplary clustering result, according to one embodiment.

In some embodiments, unsupervised machine-learning techniques can be used to detect fault by clustering the measured dynamic signals based on the extracted motion-insensitive features. FIG. 12 shows an exemplary clustering result, according to one embodiment. More specifically, the upper drawing shows the raw data, where each point represents a feature vector [MFI, STFT_SNR]. The lower drawing shows the clustering result. Note that each data point corresponds to a current signal measured during a short time period (e.g., a few seconds). The data points in each set can either be the result of continuous current monitoring or be obtained by discrete sampling of the current signal. As one can see from FIG. 12, most data points have been correctly classified with a few misclassified points, as indicated by the circle.

A closer study of the clustering result reveals that those misclassified data points represent current signals having short or no steady state period. To increase the clustering accuracy, in some embodiments, features can also be extracted from the transient states. However, the STFTs of the signals in a transient period are often quite similar for normal and abnormal operation conditions. Hence, it is hard to extract motion-insensitive features that are fault-sensitive from the transient STFT signals. On the other hand, MFI in a transient period can be different for normal and abnormal robot conditions.

Figure 13:
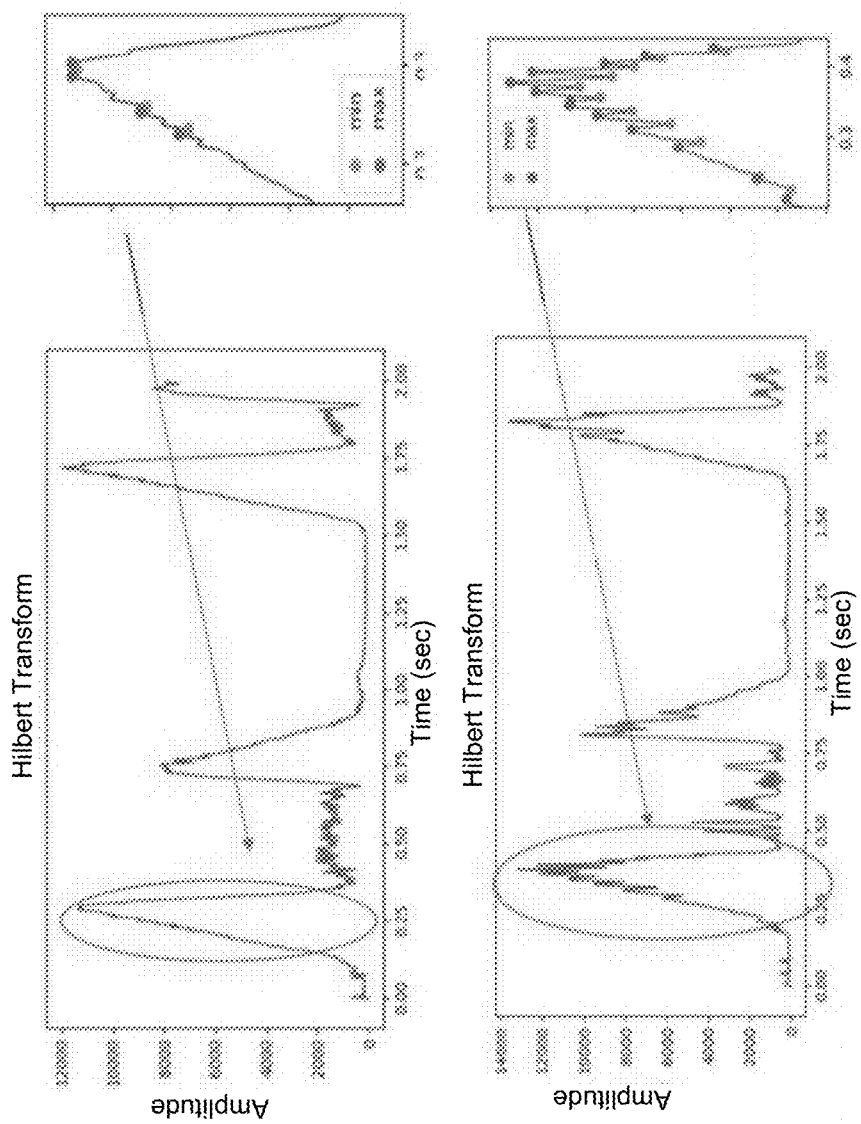
FIG. 13 shows the local maxima and minima in the transient state, according to one embodiment.

To calculate the transient state MFI, one needs to increase the cutoff frequency of the low-pass filter used to smooth the Hilbert transform (e.g., increase from 20 Hz to 100 Hz) in order to capture the local maxima and minima of the signal in the transient state. The process for calculating the transient state MFI can be similar to the one shown in FIG. 11. FIG. 13 shows the local maxima and minima in the transient state, according to one embodiment. The upper drawing shows the result for normal operation conditions and the lower drawing shows the result for abnormal operation. One can see from FIG. 13 that, under abnormal operation condition, the signal magnitude oscillates more.

Figure 14:
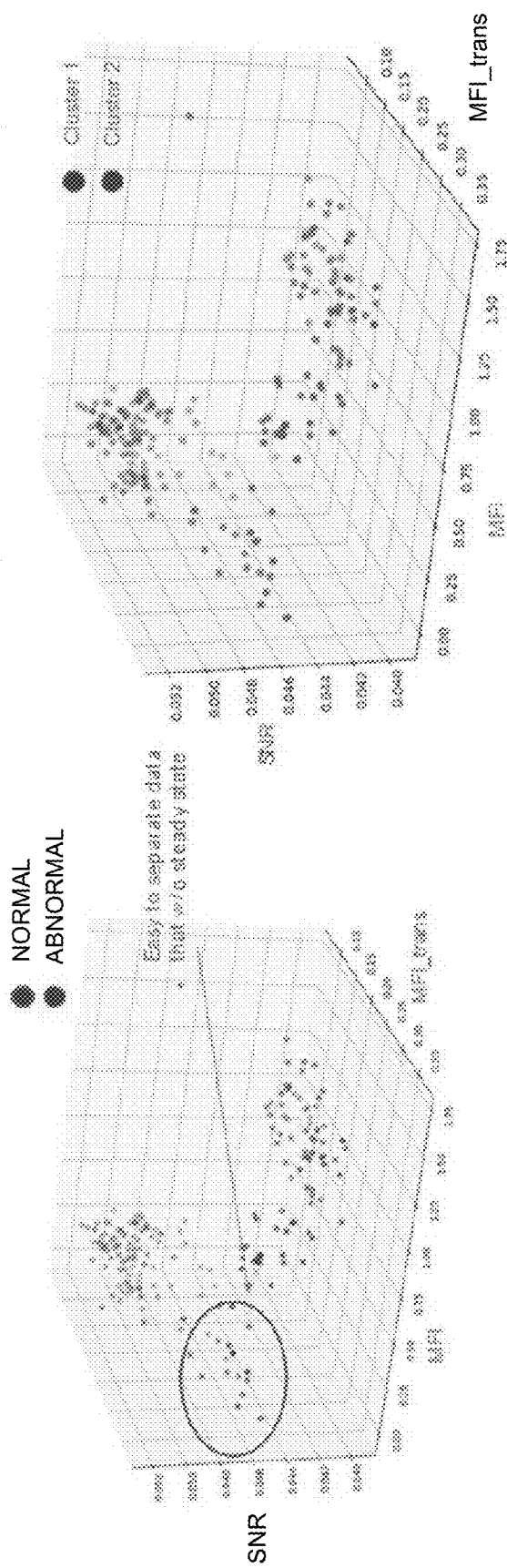
FIG. 14 shows the clustering result in a three-dimensional feature space, according to one embodiment.

FIG. 14 shows the clustering result in a three-dimensional feature space, according to one embodiment. The left drawing shows the raw data and the right drawing shows the clustering result. In FIG. 14, the feature vector is three-dimensional, [MFI, MFI_trans, STFT_SNR], where MFI is the steady state MFI, MFI_trans the transient state MFI, and STFT_SNR the SNR of the STFT signal in steady state. In this example, instead of the previously used k-means clustering technique, a Gaussian mixture models (GMM) clustering technique is used. As one can see from FIG. 14, the clustering result shows enhanced accuracy.

Figure 15A:
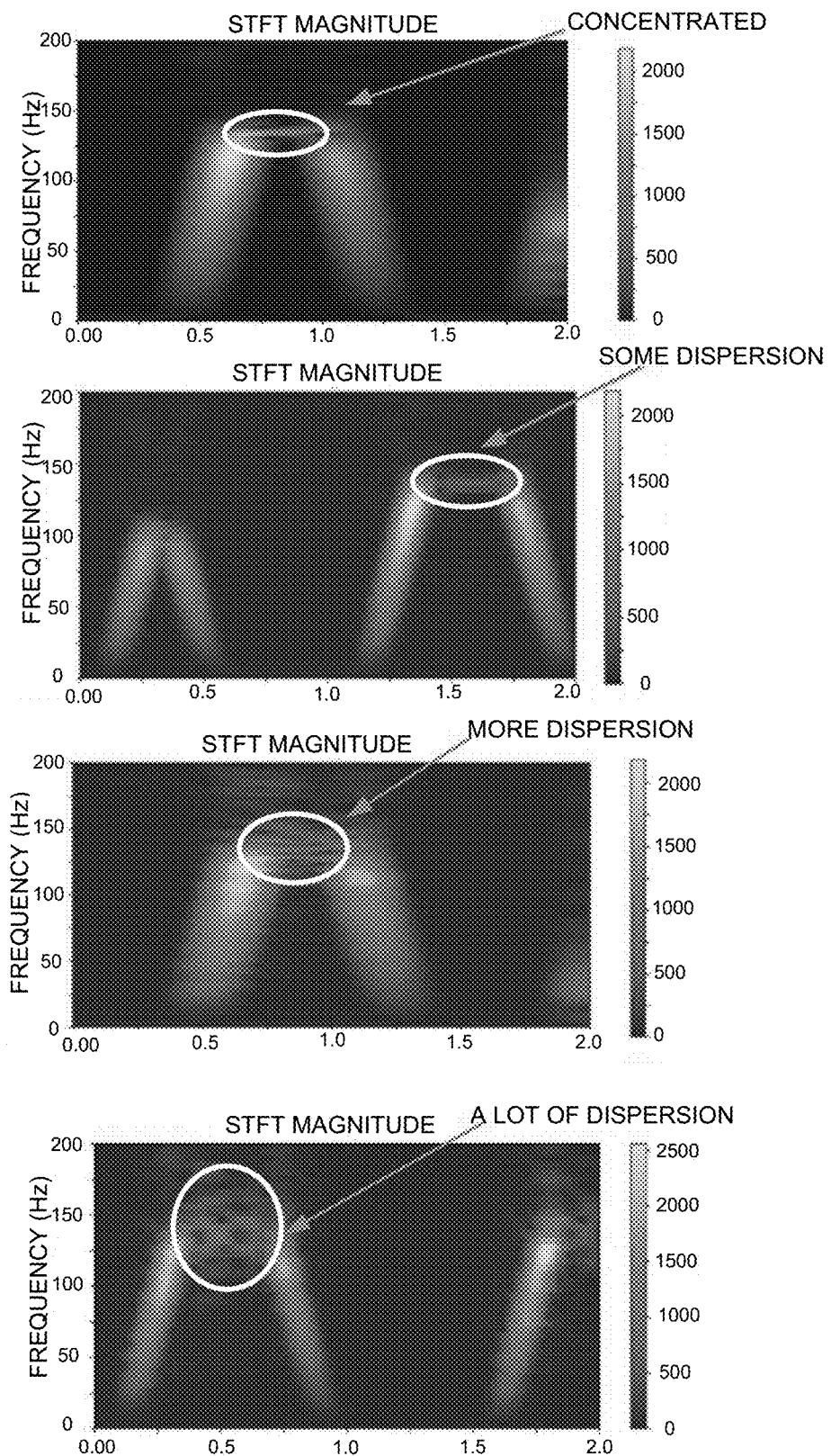
FIG. 15A shows the STFTs of the dynamic signals under different robot health conditions, according to one embodiment.
Figure 15B:
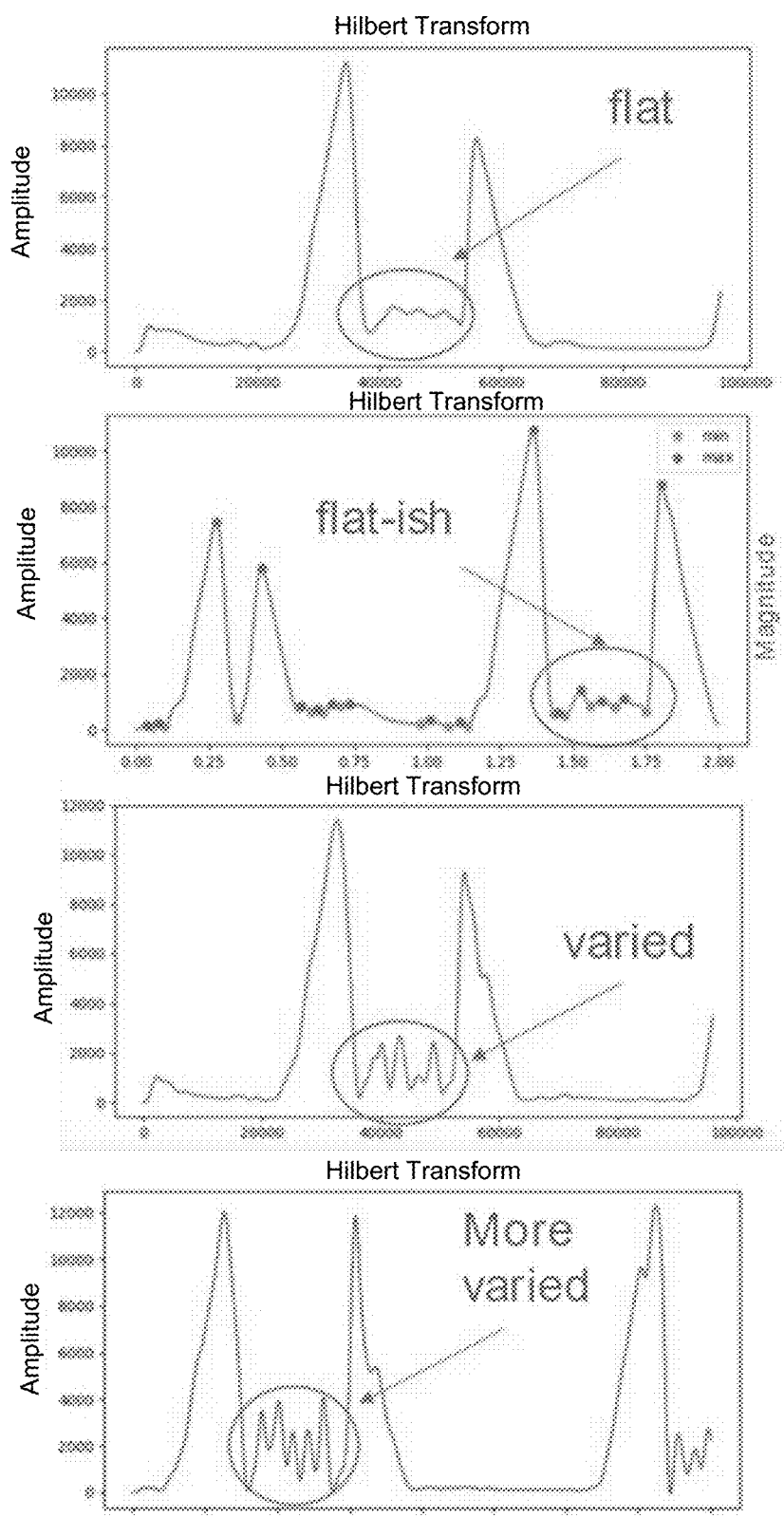
FIG. 15B shows the corresponding Hilbert transforms of the dynamic signals under different robot health conditions, according to one embodiment.

In addition to detecting fault, the solution provided by embodiments of the present invention can also be used for fault prognosis or for predicting the deterioration of the motor. Such a deterioration trend can be observed separately in both the SNR and MFI data. FIG. 15A shows the STFTs of the dynamic signals under different robot health conditions, according to one embodiment. From top to bottom, the robot operation conditions deteriorate. In this example, the gears have been degreased to intentionally achieve the wear-out failure. The top drawing is for a no-fault condition, the second to top is for the incipient fault condition, and the bottom drawing is for a significant fault condition. As one can see from the drawing, the steady state frequency components start to disperse at the incipient fault condition. FIG. 15B shows the corresponding Hilbert transforms of the dynamic signals under different robot health conditions, according to one embodiment. The operation conditions in FIG. 15B correspond to those shown in FIG. 15A. Similar to FIG. 15A, the amplitude oscillation in the steady state becomes more significant as the motor condition deteriorates.

Figure 15C:
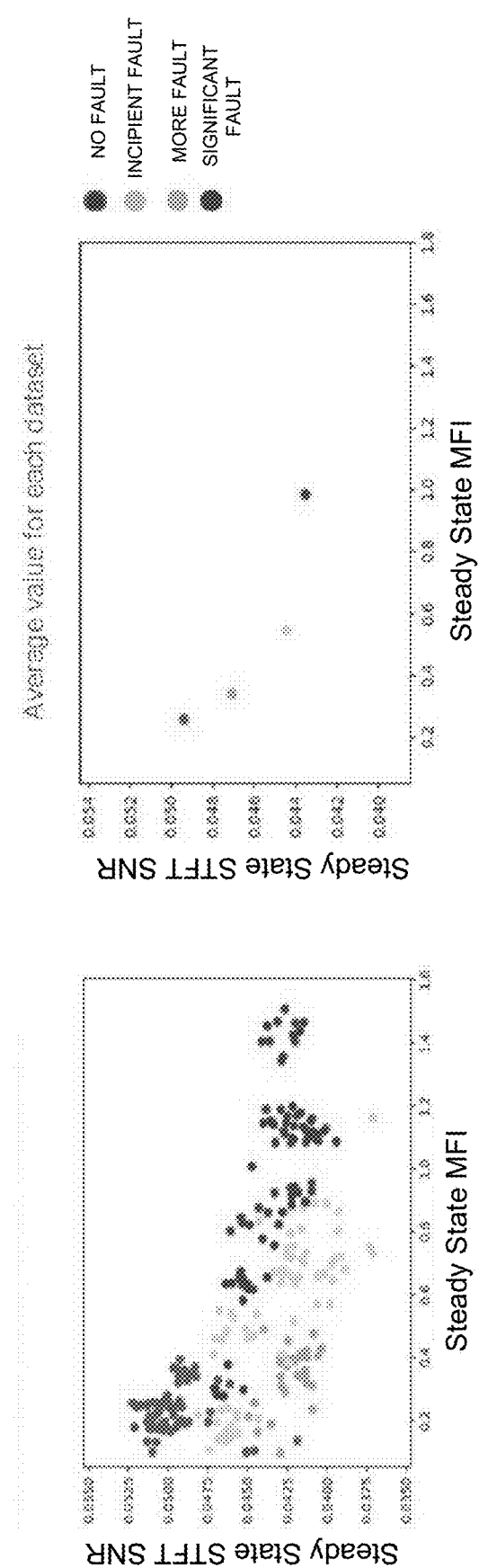
FIG. 15C shows the feature space for the different robot health conditions, according to one embodiment.

FIG. 15C shows the feature space for the different robot health conditions, according to one embodiment. The left drawing shows all data points, and the right drawing shows the average feature values for the different operation conditions. As one can see from FIG. 13, the SNR decreases and the MFI increases as the motor condition worsens. FIGS.

15A-15C also show that, although incipient fault features are shown in both the STFT and Hilbert transform signals, they are more clearly shown in the STFT signals. In other words, computing the steady state SNR of the STFT signal can provide a better indicator of incipient fault. The MFI feature is amplitude-based and more susceptible to noise and signal fluctuation. The ability to detect or predict the incipient fault enables condition-based maintenance of factory robots. For example, once incipient fault is detected, the system can send an alert to the maintenance crew to perform the needed maintenance on the robot before a more serious fault occurs.

Exemplary Computer System and Apparatus

Figure 16:
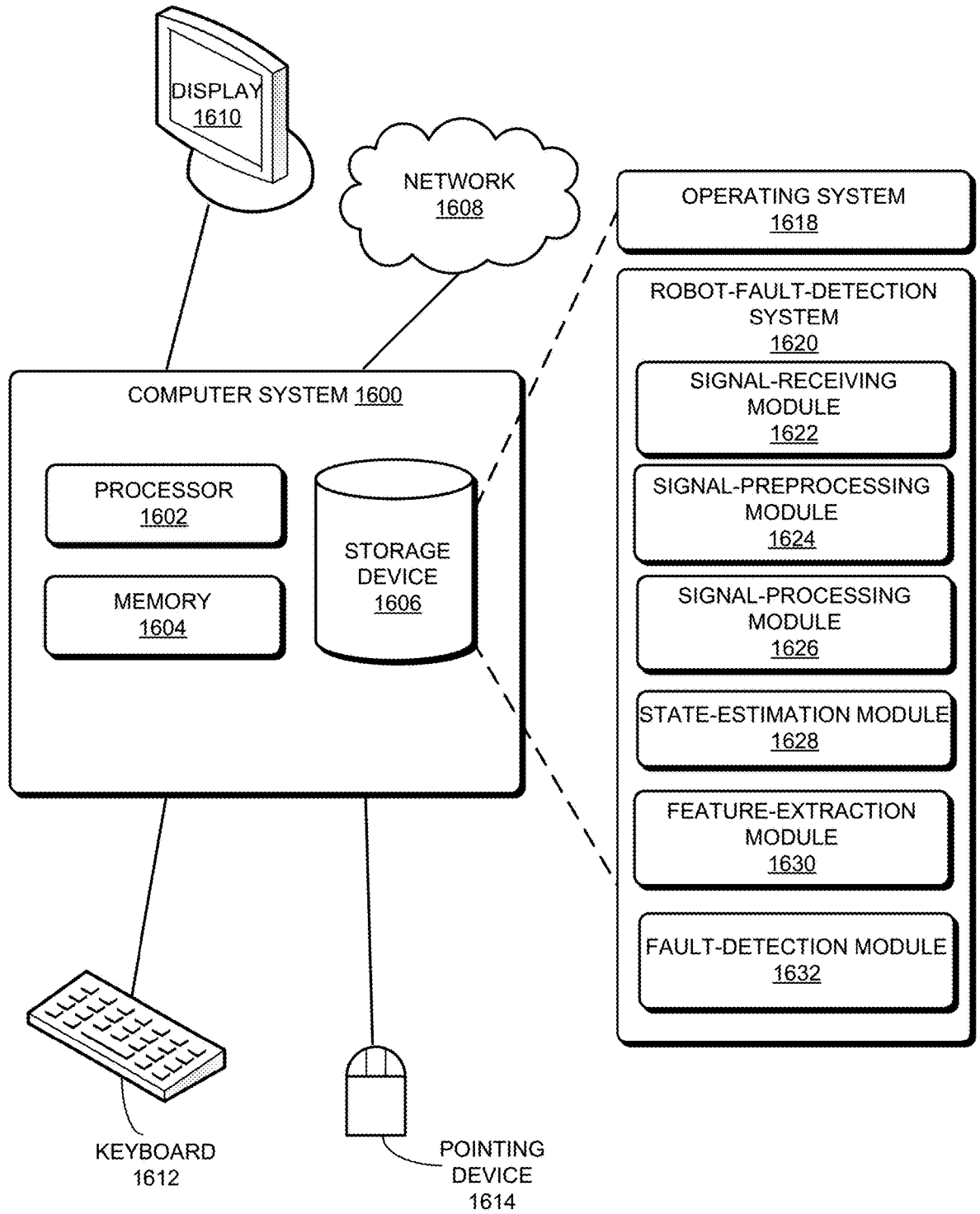
FIG. 16 illustrates an exemplary computer system that facilitates a robot-fault-detection system, according to one embodiment.

FIG. 16 illustrates an exemplary computer system that facilitates a robot-fault-detection system, according to one embodiment. Computer system 1600 includes a processor 1602, a memory 1604, and a storage device 1606. Computer system 1600 can be coupled to a display device 1610, a keyboard 1612, and a pointing device 1614, and can also be coupled via one or more network interfaces to network 1608. Storage device 1606 can store an operating system 1618, and a robot-fault-detection system 1620.

Robot-fault-detection system 1620 can include instructions, which when executed by computer system 1600 can cause computer system 1600 to perform methods and/or processes described in this disclosure. Robot-fault-detection system 1620 can also include instructions for receiving a dynamic signal associated with the robot (signal-receiving module 1622), instructions for preprocessing the received signal (signal-preprocessing module 1624), and instructions for processing the preprocessed signal (signal-processing module 1626). Furthermore, robot-fault-detection system 1620 can include instructions for estimating motion states of the signal (state-estimation module 1628), instructions for extracting motion-insensitive features (feature-extraction module 1630), and instructions for detecting robot fault (fault-detection module 1632). In some embodiments, the fault-detection module can include an unsupervised machine-learning module.

Figure 17:
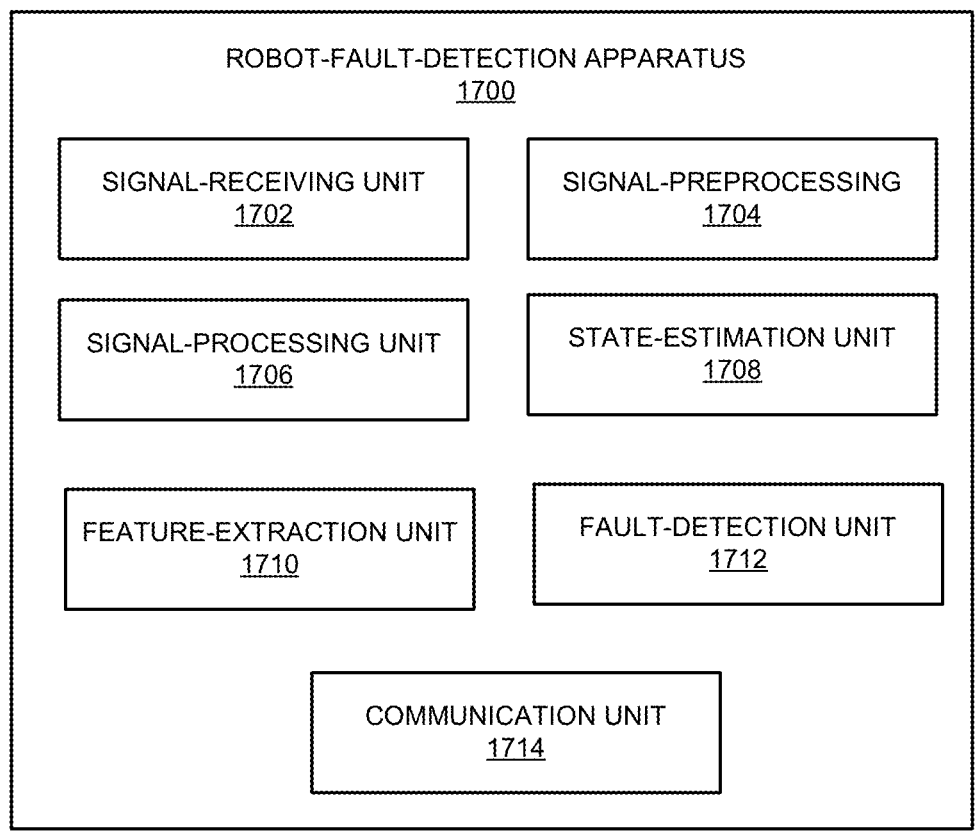
FIG. 17 illustrates an exemplary apparatus that facilitates a robot-fault-detection system, according to one embodiment.

FIG. 17 illustrates an exemplary apparatus that facilitates a robot-fault-detection system, according to one embodiment. Apparatus 1700 can comprise a plurality of units or apparatuses that may communicate with one another via a wired, wireless, quantum light, or electrical communication channel. Apparatus 1700 may be realized using one or more integrated circuits, and may include fewer or more units or apparatuses than those shown in FIG. 17. Further, apparatus 1700 may be integrated in a computer system, or realized as a separate device that is capable of communicating with other computer systems and/or devices. Specifically, apparatus 1700 can comprise units 1702-1712, which perform functions or operations similar to modules 1622-1632 of computer system 1600 of FIG. 16, including: a signal-receiving unit 1702, a signal-preprocessing unit 1704, a signal-processing unit 1706, a state-estimation unit 1708, a feature-extraction unit 1710, and a fault-detection unit 1712. Apparatus 1700 can further include a communication unit 1714.

In general, embodiments of the present invention provide a fault-diagnosis and/or prognosis solution for various types of equipment that involve motions. Detecting faults in factory robots has been used as an example. In practice, this solution is not limited to detecting faults in factory robots. It can also be used to detect faults in other types of equipment or machinery that include moving, especially rotating, components (e.g., wind or gas turbines, engines, pumps, etc.). Moreover, in addition to extracting motion-insensitive features from the various time-frequency representations (e.g., STFT or HT) of the current signal, it is also possible to extract the motion-insensitive features from other types of dynamic signal associated with the equipment or machinery. For example, motion-insensitive features extracted from the vibration or noise signals of a wind turbine may indicate whether the wind turbine is operating normally.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for detecting faults in a machine, comprising:
   performing a measurement, by one or more sensors associated with the machine, to obtain a dynamic signal associated with the machine while the machine is operating;
   applying one or more signal-processing techniques to the dynamic signal to obtain frequency, amplitude, and/or time-frequency information associated with the dynamic signal;
   segmenting the dynamic signal into a number of motion states based on the frequency, amplitude, and/or time-frequency information, which comprises computing a variance of a frequency component having a maximum power;
   extracting motion-insensitive features from the frequency, amplitude, and/or time-frequency information based on the segmented dynamic signal; and
   determining whether a fault occurs in the machine based on the extracted features.

2. The method of claim 1, wherein the dynamic signal comprises one of:
   a current signal;
   a vibration signal; and
   an acoustic signal.

3. The method of claim 1, further comprising preprocessing the obtained dynamic signal to remove high-frequency noise.

4. The method of claim 1, wherein the signal-processing techniques comprise one or more of:

a time-domain analysis technique;
a frequency-domain analysis technique; and
a time-frequency-domain analysis technique.

5. The method of claim 4, wherein the time-domain analysis technique comprises Hilbert transform (HT), wherein the frequency-domain analysis technique comprises Fourier transform (FT), and wherein the time-frequency-domain analysis technique comprises one or more of:
short-time Fourier transform (STFT);
wavelet transform; and
matching pursuit (MP).

6. The method of claim 1, wherein the motion states comprise one or more of:
an idle state;
a transient state; and
a steady state.

7. The method of claim 6, wherein extracting the motion-insensitive features comprises one or more of:
computing, during the steady state, a ratio between a power of a frequency component having a maximum power and a total power of other frequency components;
computing, during the steady state, a magnitude fluctuation index; and
computing, during the transient state, a magnitude fluctuation index based on a Hilbert transform of the dynamic signal.

8. The method of claim 1, wherein determining whether the fault occurs comprises:
constructing a feature vector based on the extracted features; and
applying an unsupervised machine-learning technique to classify the feature vector.

9. The method of claim 8, wherein the unsupervised machine-learning technique comprises a k-means clustering technique or a Gaussian mixture models (GMM) clustering technique.

10. An apparatus for detecting faults in a machine, comprising:
one or more sensors for obtaining a dynamic signal associated with the machine;
a signal-processing module configured to apply one or more signal-processing techniques on the dynamic signal to obtain frequency, amplitude, and/or time-frequency information associated with the dynamic signal;
a state-segment module configured to segment the dynamic signal into a number of motion states based on the frequency, amplitude, and/or time-frequency information, wherein while segmenting the dynamic signal, the state-segment module computes a variance of a frequency component having a maximum power;
a feature-extraction module configured to extract motion-insensitive features from the frequency, amplitude, and/or time-frequency information associated with the dynamic signal; and
a fault-detection module configured to determine whether a fault occurs in the machine based on the extracted features.

11. The apparatus of claim 10, wherein the one or more sensors comprise:
a current sensor;
a motion sensor; and
a sound sensor.

12. The apparatus of claim 10, further comprising a signal preprocessing module configured to preprocess the obtained dynamic signal to remove high-frequency noise, wherein the signal-processing module is configured to perform one or more of:
a time-domain analysis technique;
a frequency-domain analysis technique; and
a time-frequency-domain analysis technique.

13. The apparatus of claim 10, wherein the motion states comprise one or more of:
an idle state;
a transient state; and
a steady state.

14. The apparatus of claim 13, wherein the feature-extraction module extracts the motion-insensitive features by one or more of:
computing, during the steady state, a ratio between a power of a frequency component having a maximum power and a total power of other frequency components;
computing, during the steady state, a magnitude fluctuation index; and
computing, during the transient state, a magnitude fluctuation index based on a Hilbert transform of the dynamic signal.

15. The apparatus of claim 10, wherein the fault detection module determines whether the fault occurs by:
constructing a feature vector based on the extracted features; and
applying an unsupervised machine-learning technique to classify the feature vector.

16. The apparatus of claim 15, wherein the unsupervised machine-learning technique comprises a k-means clustering technique or a Gaussian mixture models (GMM) clustering technique.

* * * * *